Jan. 10, 1967 R. R. REISER 3,297,859

COUNTING DIRECTION CONTROL CIRCUIT FOR USE WITH REVERSIBLE COUNTERS

Filed June 24, 1965 2 Sheets-Sheet 1

INVENTOR
RALPH R. REISER
BY G. C. Smith
ATTORNEY

| J | K | S | $\bar{S}$ |
|---|---|---|---|
| 1 | 0 | 1 | 0 |
| 0 | 1 | 0 | 1 |

Figure 2 (a)

| E | F | $\bar{F}$ |
|---|---|---|
| 1 | 0 | 1 |
| 0 | 1 | 0 |

Figure 2 (b)

| | | I INPUT | | | | D INPUT | | | | | |
|---|---|---|---|---|---|---|---|---|---|---|---|
| | S | 0 | 0 | 1 | 1 | 0 | 0 | 1 | 1 | S | |
| A | B \ E | 0 | 1 | 1 | 0 | 0 | 1 | 1 | 0 | E / B | A |
| 0 | 0 | NO OUTPUT | | | | | | | | 0 | 0 |
| 0 | 1 | 1 | 1 | 0 | 1 | 0 | 0 | 1 | 0 | 1 | 0 |
| 1 | 1 | UNDEFINED | | | | | | | | 1 | 1 |
| 1 | 0 | 1 | 0 | 1 | 1 | 0 | 1 | 0 | 0 | 0 | 1 |

Figure 2 (c)

$S^{n+1} =$

| | $S^n$ | 0 | 0 | 1 | 1 |
|---|---|---|---|---|---|
| A | B \ E | 0 | 1 | 1 | 0 |
| 0 | 0 | NO OUTPUT | | | |
| 0 | 1 | 0 / − | 0 / − | 1 / + | 0 / − |
| 1 | 1 | UNDEFINED | | | |
| 1 | 0 | 1 / + | 0 / − | 1 / + | 1 / + |

Figure 2 (d)

INVENTOR
RALPH R. REISER
BY A. C. Smith
ATTORNEY 3,297,859

COUNTING DIRECTION CONTROL CIRCUIT FOR USE WITH REVERSIBLE COUNTERS

Ralph R. Reiser, San Jose, Calif., assignor to Hewlett-Packard Company, Palo Alto, Calif., a corporation of California Filed June 24, 1965, Ser. No. 466,727
6 Claims. (Cl. 235—92)

Figure 1:
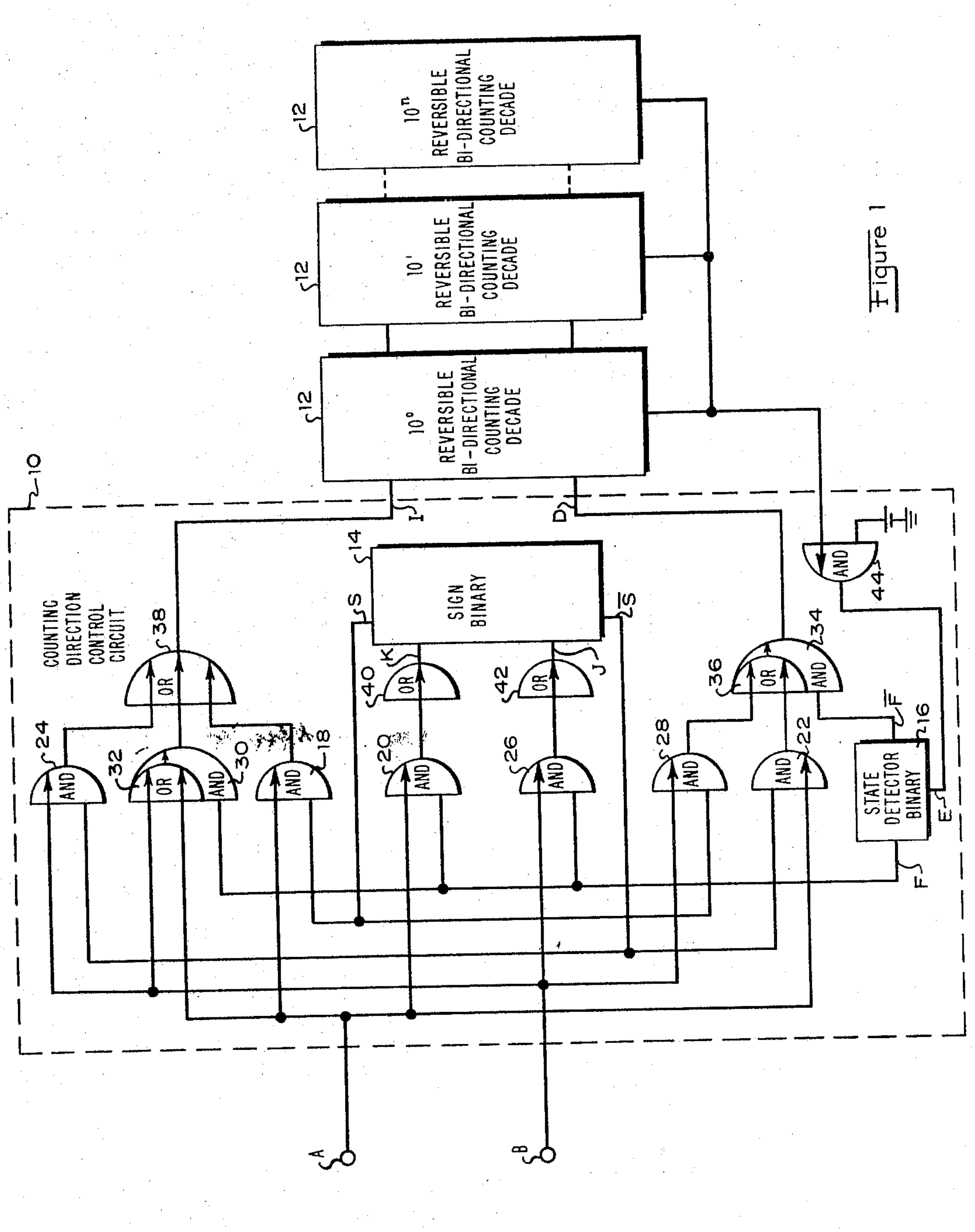

This invention relates to counting direction control circuits for reversible decades.

The principal object of this invention is to provide a control circuit for automatically reversing the numerical direction of counting of a reversible decade at a preselected magnitude such as zero.

Other and incidental objects of this invention will become apparent from a reading of this specification and an inspection of the accompanying drawing in which:

FIGURE 1 is a schematic diagram of a counting direction control circuit according to this invention; and FIGURES 2(*a*) thru 2(*d*) are a group of logic diagrams explaining the operation of the counting direction control circuit of FIGURE 1.

In accordance with the illustrated embodiment of this invention there is provided a counting direction control circuit having two input leads for receiving input pulses separated by at least a minimum time interval. This circuit is connected to sample a plurality of reversible decades for a predetermined magnitude and to accordingly direct the input pulses along one of several signal flow paths, each having an identical transition time, to the appropriate one of the magnitude increase and magnitude decrease inputs of the first decade.

Referring now to FIGURE 1, there is shown a preferred embodiment of this invention comprising a counting direction control circuit 10 having two input terminals A and B. For purposes of explanation it is arbitrarily assumed that a series of input pulses, each pulse representing one count, is applied to input terminal A for algebraic addition to a number the digital value of which is stored in the reversible counting decades 12. Similarly, a series of input pulses is applied to input terminal B to be subtracted algebraically from this number. The input pulses applied to input terminals A and B must be separated by a minimum time interval selected to be at least equal to the transit time of a pulse passing through one of the decades 12 so that only one pulse at a time will be applied to each decade. An anticoincidence circuit (not shown) such as that described in the co-pending patent application Serial Number 411,459 of Carl-Ernst G. Nourney entitled ANTICOINCIDENCE CIRCUIT and filled on November 16, 1964, may be used to provide this selected minimum time interval.

The counting direction control circuit 10 comprises a plurality of AND gates each having a signal input indicated in the drawing by an arrowhead, a control input connected to an output of either the sign binary 14 or the state detector binary 16, and an output. Whenever both the signal and control inputs of one of these AND gates are in the "1" state the output is also in the "1" state; otherwise it is in the "0" state. The signal input of each of the AND gates 18, 20 and 22 is connected to be driven into the "1" state by the pulses at the A input of counting direction control circuit 10. Similarly, the signal input of each of the AND gates 24, 26, and 28 is connected to be driven into the "1" state by the pulses at the B input. AND gate 30 is provided with an OR gate signal input 32 which is connected to be driven into the "1" state by the pulses at both the A and B input terminals of counting direction control circuit 10. Similarly, AND gate 34 is provided with an OR gate signal input

36 which is connected to be driven by the output of each of the AND gates 22 and 28. The output of AND gate 34 is connected to drive the decrease magnitude input D of the first reversible bidirectional counting decade 12 so as to decrease the magnitude stored in the decades. Similarly, the output of each of the AND gates 18, 24, and 30 is connected by OR gate 38 to drive the increase magnitude input I of the first decade 12 so as to increase the magnitude stored in the decades. AND gates 20 and 26 are connected by OR gates 40 and 42 to drive the K and J inputs, respectively, of sign binary 14. OR gates 38, 40, and 42 are used so that each of the signal flow paths of counting direction control circuit 10 will have a substantially identical transition time, thereby maintaining the selected minimum time interval between input pulses.

Sign binary 14 may be constructed, for example, as a conventional J–K flip-flop having complementary outputs designated S and $\overline{S}$. Thus, as shown in the truth table of FIGURE 2(*a*), when the J input is in the "1" state the S output is also in the "1" state, but the $\overline{S}$ output is in the "0" or complementary state. The digital condition of the S and $\overline{S}$ outputs is reversed when the K input is in the "1" state. The S output of sign binary 14 is connected to drive the control input of each of the AND gates 18 and 28. The $\overline{S}$ output is similarly connected to drive the control input of each of the AND gates 22 and 24. The S and $\overline{S}$ outputs of sign binary 14 also correspond to plus and minus outputs, respectively, for indicating the polarity of the algebraic value stored in the decades 12. When a positive value is stored in the decades 12 the S output is in the "1" state and the $\overline{S}$ output is in the "0" state. The digital condition of the S and $\overline{S}$ outputs is reversed when a negative value is stored in the decades 12.

State detector binary 16 has complementary outputs designated F and $\overline{F}$ and an input designated E. It is constructed so that, as shown in the truth table of FIGURE 2(*b*), the $\overline{F}$ output is in the "1" state and the F output is in the "0" or complementary state when the E input is in the "1" state. The digital condition of the F and $\overline{F}$ outputs is reversed when the E input is in the "0" state. The F output of state detector binary 16 is connected to drive the control input of each of the AND gates 20, 26, and 30. The $\overline{F}$ output is similarly connected to the control input of AND gate 34. State detector binary 16 is driven by AND gate 44 which is connected to sample the decades 12 to determine when the magnitude of the algebraic value stored therein equals a preselected magnitude. This preselected magnitude may be any one the digital value of which can be stored in the decades 12. For purposes of this explanation AND gate 44 is assumed to sample the decades 12 for a digital value representing the magnitude zero. AND gate 44 and the decades 12 are constructed so that the E input of state detector binary 16 is in the "1" state whenever the digital value stored in the decades 12 does not correspond to this preselected magnitude, zero. However, when the digital value stored in the decades 12 does correspond to the preselected magnitude, zero, AND gate 44 drives the E input of state detector binary 16 into the "0" state.

In operation the AND gates 18, 20, 22, 24, 26, 28, 30 and 34 are opened or closed in response to the D.-C. condition of the sign binary 14 and the state detector binary 16 to arrange the appropriate signal flow paths between the A and B inputs of counting direction control circuit 10 and the magnitude increase and magnitude decrease inputs I and D of the first decade 12. This operation is readily explained with the aid of the Karnaugh map of FIGURE 2(*c*) and the truth tables of FIGURES 2(*a*) and 2(*b*). A detailed explanation of the Karnaugh map is given in Phister, Logical Design of Digitial Computers 48–49, 86–96 (1960). Obviously, the counting direction control circuit 10 applies no pulses to be counted to the decades 12 when there is no input signal, that is, when both input terminals A and B are in the "0" state. The operation of the counting direction control circuit is undefined for the situation in which coincident pulses are applied to the input terminals A and B, that is, when both terminals are in the "1" state. However, this undefined condition is eliminated since the pulses applied to input terminals A and B are separated by at least the selected minimum time interval, for example, by an anti-coincidence circuit. For the remaining possible sets of initial conditions the counting direction control circuit 10 applies an output pulse to either the increase magnitude or decrease magnitude inputs, I or D, of the first decade 12 as indicated in FIGURE 2(*c*) by a "1" for the appropriate decade input. The possible signal flow paths, each having an equal transition time, for these remaining initial conditions are indicated in the following modified truth table.

| A | B | S | E | Signal Flow Paths |
|---|---|---|---|---|
| 0 | 1 | 0 | 0 | B→ AND gates 24/30→ OR gate 38→ I. |
| 0 | 1 | 0 | 1 | B→ AND gate 24→ OR gate 38→ I. |
| 0 | 1 | 1 | 1 | B→ AND gates 28 & 34→ D. |
| 0 | 1 | 1 | 0 | B→ AND gate 30→ OR gate 38→ I. |
| 1 | 0 | 0 | 0 | A→ AND gate 30→ OR gate 38→ I. |
| 1 | 0 | 0 | 1 | A→ AND gates 22 & 34→ D. |
| 1 | 0 | 1 | 1 | A→ AND gate 18→ OR gate 38→ I. |
| 1 | 0 | 1 | 0 | A→ AND gates 18/30→ OR gate 38→ I. |

The operation of the sign binary 14 which is driven by AND gates 20 and 26, is illustrated with the aid of the Karnaugh map of FIGURE 2(*d*) and the truth table of FIGURE 2(*a*). The state of $S^{n+1}$ for each possible set of initial conditions is shown in the Karnaugh map above the plus or minus sign indicating the sign of the algebraic value the magnitude of which is stored in the decades 12.

The representative embodiment of the counting direction control circuit 10 described herein doubles the digital dynamic range of the decades. For example, it provides each decade 12 with a dynamic counting range from +9 to −9, when the preselected magnitude is zero, without requiring increased minimum spacing between input pulses. In addition it provides the sign of the algebraic value the magnitude of which is stored in the decades 12.

I claim:

1. In counting apparatus for receiving input signals to be algebraically added to and subtracted from a count registered in a reversible counting means having a magnitude increase terminal and a magnitude decrease terminal, a counting direction control circuit for directing each of the input signals to the appropriate one of the magnitude increase and magnitude decrease terminals of the counting means, said control circuit comprising:

an input for receiving the input signals to be algebraically added to the count registered in the counting means, and another input for receiving the input signals to be algebracially subtracted from the count registered in the counting means;

a plurality of gates connecting each of said inputs to each of the magnitude increase and magnitude decrease terminals of the counting means;

sampling means responsive to operation of the reversible counting means in a preselected state for independently activating at least one of said gates without altering the state of the reversible counting means to apply the next input signal received at either of said inputs to the magnitude increase terminal of the reversible counting means;

a sign indicator connected for activating at least one other of said gates during operation of the counting means in another state to apply the next input signal received at one of said inputs to the appropriate one of the magnitude increase and magnitude decrease terminals of the counting means, said indicator having two operating conditions each of which is indicative of the registration of a count of different sign in the counting means and each of which is altered in response to a selected input signal applied to the indicator during operation of the counting means in the preselected state; and gating means responsive to operation of the counting means in the preselected state for applying the next input signal to said indicator and responsive to operation of the counting means in said other state for preventing application of the next input signal to said indicator.

2. In counting apparatus for receiving inputs signals to be algebraically added to and subtracted from a count registered in a reversible counting means having a magnitude increase terminal and a magnitude decrease terminal, a counting direction control circuit as in claim 1 wherein:

said sampling means includes a sampling gate;

said sign indicator is a bistable device having two trigger terminals, each of which corresponds to a different one of the two operating conditions of said device; and said gating means connects each of said inputs to a different one of the trigger terminals of said device for altering the operating condition of said device when an input signal is applied to a trigger terminal corresponding to one operating condition of said device during operation of said device in the other operating condition.

3. Counting apparatus comprising:

reversible counting means having a plurality of operating states each of which is indicative of the magnitude of a different count, said counting means including a magnitude increase terminal and a magnitude decrease terminal and being responsive to application of a signal to one of said terminals for changing operating states;

an input for receiving input signals to be counted in one sense, and another input for receiving input signals to be counted in another sense;

a plurality of signal paths connecting each of said inputs to each of said magnitude increase and magnitude decrease terminals, said signal paths each having an activated condition for applying an input signal to one of said magnitude increase and magnitude decrease terminals and an unactivated condition for preventing application of an input signal to said one terminal;

control means responsive to operation of said counting means in one of said states for independently activating at least one of said signal paths without altering the state of said counting means to apply the next input signal received at either of said inputs to a selected one of said magnitude increase and magnitude decrease terminals;

a sense indicator connected for activating another of said signal paths during operation of said counting means in another of said states to apply the next input signal received at one of said inputs to the appropriate one of said magnitude increase and magnitude decrease terminals, said indicator having two operating conditions each of which is indicative of the registration of a count of different sense in said counting means and each of which is altered in response to a selected input signal applied to the indicator during operation of said counting means in said one state; and additional control means responsive to operation of said counting means in said one state for applying the next input signal to said indicator and responsive to operation of said counting means in said other state for preventing application of the next input signal to said indicator.

4. Counting apparatus as in claim 3 wherein:

said first-named control means includes a sampling gate;

said sense indicator is a bistable device having two trigger terminals, each of which corresponds to a different one of the two operating conditions of said device; and said additional control means includes a pair of gates connecting each of said inputs to a different one of the trigger terminals of said device for altering the operating condition of said device when an input signal is applied to a trigger terminal corresponding to one operating condition of said device during operation of said device in the other operating condition.

5. Counting apparatus comprising:

reversible counting means having a plurality of operating states each of which is indicative of the magnitude of a different count, said counting means including a magnitude increase terminal and a magnitude decrease terminal and being responsive to application of a signal to one of said terminals for changing operating states;

an input for receiving input signals to be algebraically added to a count registered in the counting means and another input for receiving input signals to be algebraically subtracted from the count registered in the counting means;

a plurality of signal paths two of which connect each of said inputs to said magnitude increase terminal and four others of which connect each of said inputs to each of said magnitude increase and magnitude decrease terminals, said signal paths each having an activated condition for applying an input signal to one of said magnitude increase and magnitude decrease terminals and an unactivated condition for preventing application of an input signal to said one terminal;

control means responsive to operation of said counting means in the one of said states which corresponds to the registration of a count of zero magnitude in said counting means for independently activating at least one of said two signal paths without altering the state of said counting means to apply the next input signal received at either of said inputs to said magnitude increase terminal;

a sign indicator connected for activating at least one of said four other signal paths during operation of said counting means in another of said states to apply the next input signal received at one of said inputs to the appropriate one of said magnitude increase and magnitude decrease terminals, said indicator having two operating conditions each of which is indicative of the registration of a count of different sign in said counting means and each of which is altered in response to a selected input signal applied to said indicator during operation of said counting means in said one state; and gating means responsive to operation of said counting means in said one state for applying the next input signal to said indicator and responsive to operation of said counting means in said other state for preventing application of the next input signal to said indicator.

6. Counting apparatus as in claim 5 wherein:

said control means includes a sampling gate;

said sign indicator is a bistable device having two trigger terminals, each of which corresponds to a different one of the two operating conditions of said device; and said gating means connects each of said inputs to a different one of the trigger terminals of said device for altering the operating condition of said device when an input signal is applied to a trigger terminal corresponding to one operating condition during operation of said device in the other operating condition.

References Cited by the Examiner

UNITED STATES PATENTS 2,970,759 2/1961 Lanning ------------- 235—92

FOREIGN PATENTS 975,941 10/1950 France.

OTHER REFERENCES

"A Sign & Magnitude Display for Use with Reversible Counters," from Electronic Engineering, pp. 605–606, October 1958.

MAYNARD R. WILBUR, *Primary Examiner.*

J. F. MILLER, *Assistant Examiner.*